Patented Dec. 2, 1924.

1,517,520

UNITED STATES PATENT OFFICE.

CHARLES E. SWETT, OF BOSTON, MASSACHUSETTS, ASSIGNOR OF ONE-HALF TO HARRY H. BECKWITH, OF BROOKLINE, MASSACHUSETTS.

STIFFENING AGENT FOR FIBROUS MATERIALS.

No Drawing.  Application filed August 24, 1920. Serial No. 405,730.

*To all whom it may concern:*

Be it known that I, CHARLES E. SWETT, a citizen of the United States, residing at Boston, in the county of Suffolk and State of Massachusetts, have invented new and useful Improvements in Stiffening Agents for Fibrous Materials, of which the following is a specification.

The object of this invention is the production of a water-insoluble stiffening substance or agent which may be employed for saturating or coating fibrous materials and thereby making such materials more or less resilient, and which may be softened by the application of relatively mild heat, so that the treated material may be molded and caused to set in its molded form. The agent or substance referred to comprises a resin and an initially water-soluble colloid, in the form of a solid solution. I have discovered that, if common rosin be saponified with ammonia and water, a solution of substantially any water-soluble colloid may be mixed therewith so as to form a practically perfect incorporation of the rosin and the colloid as a solid solution on removal of the water and the ammonia. I have secured excellent results with a solution of ammonium resinate, produced by two parts of common rosin with sufficient ammonia to make a clear solution in water, and one part of a water-soluble colloid dissolved in water. The two solutions are apparently miscible when thoroughly mixed. The liquid thus produced is employed for impregnating any fibrous material, e. g., felt, woven or braided fabric, paper or the like. The impregnation may be accomplished in any suitable way, as by conducting the fibrous material through a bath of the solution; after which the water is removed, by gentle heat, or by a partial vacuum, or by exposure to the atmosphere. When the water is removed from the solution, the residuum dries to a homogeneous condition of solid solution, without separation of the water-soluble colloid from the rosin, evaporation of the ammonia from the resinate regenerating the rosin, to all intents and purposes, to its original water-insoluble state. Hence, when the fibrous material is dried, its interstices are more or less filled and its fibers coated with the residual solid rosin glue solution referred to, and, while semi-flexible, is fairly stiff and also resilient. The fibrous material may now, by the application of hot water vapor or by radiated heat, be softened and rendered limp, so that it may be molded into any desired form.

A particular and especial use to which the treated fibrous material may be put is in the manufacture of stiffeners for boots and shoes, e. g., toe boxes or counter stiffeners. In the manufacture thereof, a sheet of felt or other absorbent material is first impregnated with the initial aqueous solution, and, after it has been dried, the blanks of the desired shape for the predetermined use, for example as toe boxes, are cut from the sheet and skived ready for assembly with the parts of the upper. After the upper is placed on the last and tacked at the sides over the innersole, the end of the shoe is inserted in any one of the common shoe heaters now in use, in consequence of which the box blank is softened,—whereupon, by a suitable end-lasting machine, the end of the upper, including the limp and softened box blank, is wiped about the end of the last, and the blank is thus molded to the shape of the last. On cooling, the box sets fairly rigidly in its molded form.

I have herein referred to the use of a water-soluble colloid for incorporation in the initial aqueous solution of ammonium resinate, and have indicated that most of such colloids are suitable for the purpose. For instance, one may comprise casein in water with a suitable assistant to the solution. I have variously used animal glue, or one of the derivatives of algin (e. g. the copper salt of alginic acid dissolved in water with the aid of ammonia), which I refer to merely as typifying the colloids which may be employed.

It may be desired to impart a water-resistant character to a colloid typified by animal glue, and this may easily be accomplished by subjecting the treated fibrous material to the action of formaldehyde, either in solution or as a gas, or of aluminum or chromium salts or the like. This may be accomplished either before or after the removal of the water from the fabric.

Obviously it is not feasible to describe all of the combinations of the water-soluble colloids with the ammonia-resin solution, or to set forth the exact proportions of the resin and the water-soluble colloid, as between the resin and the water-soluble colloid the product acts differently from either of its components. For example, rosin is brittle but the new solid solution is not; glue when dry is non-moldable by heat, but the new substance is moldable. By increasing the proportion of the water-soluble colloid, e. g. glue, I secure a harder but moldable product, but a fabric treated or impregnated therewith is not as flaccid as one treated with the substance produced from two parts of rosin and one of glue. In instancing the use of glue, I, of course, am not limiting myself to this particular component.

What I claim is:—

1. A shoe stiffener consisting of a dry moldable material, capable of being softened by heat and moisture, comprising a fibrous fabric impregnated with a filling material including a resin and a water-soluble colloid in a homogeneous state of solid solution.

2. A shoe stiffener rendered moldable by the application of moist heat and comprising a fibrous fabric foundation impregnated with a thermo-plastic filling material including a resin and a water-soluble colloid in a homogeneous state of solid solution.

3. The herein described process, which comprises commingling an aqueous ammonium-resinate solution with a water-soluble colloid, impregnating a fibrous body with such solution, and removing the water, thereby producing a fibrous body which is moldable by heat.

4. The herein described process, which comprises incorporating a water-soluble colloid in an aqueous solution containing rosin and ammonia, impregnating a fibrous sheet with such solution, and then removing the water therefrom.

5. The herein described process, which comprises incorporating a water-soluble colloid in an aqueous solution containing rosin and ammonia, impregnating a fibrous sheet with such solution, removing the water therefrom, and treating such sheet to render the water-soluble colloid water-insoluble.

In testimony whereof I have affixed my signature.

CHARLES E. SWETT.